(12) United States Patent
Bradley

(10) Patent No.: US 6,179,329 B1
(45) Date of Patent: Jan. 30, 2001

(54) VEHICLE OCCUPANT RESTRAINT HARNESS

(75) Inventor: Gary Furman Bradley, Hendersonville, NC (US)

(73) Assignee: Simula, Inc., Phoenix, AZ (US)

(*) Notice: Under 35 U.S.C. 154(b), the term of this patent shall be extended for 0 days.

(21) Appl. No.: 09/270,413

(22) Filed: Mar. 16, 1999

Related U.S. Application Data

(60) Provisional application No. 60/078,598, filed on Mar. 19, 1998.

(51) Int. Cl.$^7$ .................................................. B60R 22/00
(52) U.S. Cl. ..................... 280/801.1; 280/808; 297/481; 297/484
(58) Field of Search ............................. 280/801.1, 808; 297/481, 484

(56) References Cited

U.S. PATENT DOCUMENTS

| | | | |
|---|---|---|---|
| 3,694,029 | 9/1972 | Noble et al. | 297/389 |
| 3,905,615 | 9/1975 | Schulman | 280/801.1 |
| 4,231,616 | 11/1980 | Painter | 297/481 |
| 4,302,049 | 11/1981 | Simpson | 297/484 |
| 4,396,228 | 8/1983 | Go | 297/484 |
| 4,402,548 | 9/1983 | Mason | 297/264 |
| 5,076,608 | * 12/1991 | Shimose | 280/801 |
| 5,131,683 | * 7/1992 | Johnson | 280/808 |
| 5,282,648 | 2/1994 | Peterson | 280/728.1 |
| 5,306,044 | 4/1994 | Tucker | 280/801.1 |
| 5,524,928 | 6/1996 | Monagas | 280/808 |
| 5,540,403 | 7/1996 | Standley | 244/122 B |
| 5,676,398 | * 10/1997 | Nurtsch | 280/806 |

* cited by examiner

Primary Examiner—J. J. Swann
Assistant Examiner—L. Lum
(74) Attorney, Agent, or Firm—Shaw Pittman

(57) ABSTRACT

A restraint harness that reduces frontal and lateral upper body movement of a vehicle occupant during a crash by substantially one-half over conventional restraint harnesses. In addition, the restraint harness further distributes crash load more on the occupant's shoulders, which are better able to handle the load. The restraint harness further distributes the crash load over a greater surface area than conventional restraint harnesses. In the preferred embodiment, the restraint harness is routed in a pulley configuration that restricts occupant movement to approximately one-half the distance that the occupant would move during a crash with a conventional harness restraint. The pulley action reduces slack in the straps, secures the occupant tightly to the seat, and limits the frontal and lateral displacement of the occupant's upper body, arms, and head.

23 Claims, 4 Drawing Sheets

VEHICLE OCCUPANT RESTRAINT HARNESS

The present application claims priority from the filing date of the provisional patent application serial number 60/078,598 filed Mar. 19, 1998, entitled "Vehicle Occupant Restraint Harness".

BACKGROUND

1. Field of the Invention

The present invention relates to safety apparatus. Specifically, the present invention relates to a textile harness restraint worn by an occupant of an aircraft or other vehicle with the purpose of reducing injuries during a survivable crash, especially injuries to the occupant's upper torso and head.

2. Background of the Invention

During a crash, an occupant in a vehicle (aircraft, car, train, etc.) is generally injured due to rapid motion and/or striking the vehicle's interior structure or components. Accordingly, the vehicle's occupant restraint system is a key component in minimizing and preventing such injury. Although occupant restraint systems have improved over the years, conventional seat-mounted harness restraints do not adequately restrain the head and upper torso from forward or lateral displacement in crashes.

Several conventional restraint harness systems are currently used. Each system has one or more lap belts and shoulder straps which fasten directly into a coupling device. Four-point release attachment systems have four connections, two for shoulder straps and two for lap belts. Five-point release attachment systems are four-point release attachment systems which have a crotch strap and a corresponding release. One-point release attachment systems have a lap belt and diagonal shoulder belt.

A primary drawback of conventional systems is that they are subject to user error. This is because a vehicle occupant must adjust any restraint straps and belts manually. Left to his or her own devices, the occupant generally will not tighten the restraint to the point of maximum effectiveness. One reason for this is that doing so overly restricts mobility, and when given the choice, occupants tend to choose mobility over protection. As a result, restraint straps are loose due to the slack left by the occupant. Because the straps are loose, the occupant moves significantly forward and/or upward during a crash. The motion continues until the slack is removed.

Another important drawback of conventional textile harnesses is that they expose a narrow area of the occupant's shoulders and chest to a high concentration of crash force. Distribution of the crash force is a function of occupant loading during a crash. When an occupant loads the harness during a crash, the force is distributed along the strap(s) and imparted to occupant's body at the points of contact. Thus, it is desirable to maximize the strap area that contacts the body. Doing so, disperses the force across a greater portion of the occupant's body, thereby reducing the likelihood of injury to the occupant caused by the restraint harness.

Several inflatable restraint systems are presently under development for aircraft applications. One such system, described in U.S. Pat. No. 5,282,648 (incorporated herein by reference), uses small inflatable bags attached to the shoulder harness straps to remove slack and provide head support. Although this system effectively redistributes crash loads, it requires structure in addition to the harness mechanism. Such additional structure includes pyrotechnic gas generators to inflate the inflatable bags at the time of impact. The inflatable bags remove the undesired slack. However, the additional structure adds significantly to the cost and complexity of the system.

It is desirable to have a restraint harness that considerably reduces the drawbacks of conventional harnesses described above. Moreover, it is desirable if the reduction in limitations does not add significantly to the cost and complexity of the restraint harness by requiring significant structural modifications. Thus, what is required is a restraint harness that reduces occupant-required adjustments, maximizes strap area, and limits occupant motion during a crash.

SUMMARY OF THE INVENTION

The present invention reduces occupant movement during a crash, as well as the amount of force that is imparted to any given body area, thereby reducing the extent and severity of crash-related injuries. It provides these benefits through a construction that produces a tighter restraint while distributing crash-induced loads over a comparatively wider area of an occupant's upper body than conventional systems. In addition, the present invention provides at least as much mobility for the occupant during normal operation as conventional harness restraints. Moreover, the present invention provides these benefits without increasing support material or requiring major modifications to the aircraft or vehicle structure.

The present invention is a harness restraint which is attached to the seat of a vehicle. The harness restraint of the present invention protects the occupant in the event of a crash. The present invention significantly overcomes the aforementioned problems with conventional textile harness restraints by incorporating a right and left pulley configuration in its design. The right and left pulley configuration produce a pull ratio of 2 to 1. This pull ratio is sufficient to prevent appreciable occupant motion during a crash. In practice, this pull ratio is not exactly 2 to 1 because of minimal elongation of the straps and compression of the occupant's body parts; however, without give in the components of the pulley configuration, the pull ratio would be exactly 2 to 1.

In addition to reducing slack in the harness strap, the pulley configurations of the present invention provide more strap area for wider distribution of crash-induced force. The greater strap area distributes the force of a crash over a greater portion of the occupant's body, thereby reducing the force at any given point on the occupant's body.

The pulley configuration of the present invention operates between fixed points set by parts of the vehicle occupant restraint harness attached to the seat. The fixed portions of the restraint harness include: 1) a left and right lap belt, each attached to the left and right side of the seat respectively and connected together at the center of the occupant's body by a multiple point release attachment; 2) a left and right shoulder strap adjuster attached to the multiple release attachment; and, 3) a left and right shoulder guide attached by a neck strap to the top of the seat. The shoulder strap adjusters and shoulder guides provide openings through which straps can be routed and bars over which the straps can freely travel.

Using the fixed points described above, the pulley configuration of the present invention is devised as follows. The right pulley configuration consists of a vertical strap attached to the right lap belt. From that attachment point, the vertical strap is routed up through the right shoulder guide, down through the right strap adjuster, and back up to an attachment point on the right shoulder guide. The vertical strap freely travels over the right shoulder guide and right shoulder strap adjuster bars and is anchored to the right lap belt and underside of the right shoulder guide. This same vertical strap is continuously attached from the right shoulder guide, all along the neck strap, through to the left shoulder guide. Beyond the attachment point at the left shoulder guide, the vertical strap proceeds through the same routing as the right side. The left and right pulley configuration are mirror opposites of each other. For simplification, only the right side is described; however, it is understood that the left side is identically arranged.

Routing the vertical strap through the shoulder guides and adjusters in the sequence described above causes the vertical straps to cross an occupant's torso twice on each side. Conventional harness restraints have either a single diagonal shoulder strap or one right and one left vertical (torso) strap. Thus, the present invention provides at least twice as much strap area in contact with the occupant as a conventional harness restraint. The wider strap area increases the area for the distribution of crash-induced force, and provides greater restraint against occupant movement.

The present invention provides the occupant with the same mobility as conventional straps. This is because the webbing vertical straps can move freely through the guides and shoulder strap adjusters. In this manner, the present invention achieves its goal of providing the occupant freedom of mobility when wearing the harness restraint.

In the event of a crash, the occupant moves forward thereby loading the harness. The pulley configuration of the present invention only allows the occupant to move forward approximately one-half the distance that he/she would move during a crash with a conventional harness restraint. The pulley action reduces slack in the straps, secures the occupant tightly to the seat, and limits the frontal and lateral displacement of the occupant's upper body, arms, and head. The harness restraint of the present invention also limits vertical movement because the vertical straps on each side of the occupant's body attach to the five-point release attachment and lap belt in an approximate straight-line configuration with the crotch strap and lap belt attachment. The pulley configuration of the present invention provides a long strap length over which the loading force is distributed, as well as a highly effective restraint against lateral and vertical movement. The pulley configuration causes most of the crash force to be placed on the occupant's shoulders, not the chest as in conventional harness restraints. This is desirable because the occupant's shoulders are stronger and better suited to withstand the force of an impact than the chest. The remaining force is distributed across the chest by the webbing area of the straps that extend from the shoulders to the lap belt and to the five-point release attachment. The redistribution of crash forces to parts of the occupant's body better able to withstand the crash forces reduces the extent and severity of injuries that the occupant is likely to sustain during a crash.

Accordingly, it is an object of the present invention to provide a seat harness restraint that protects the occupant of an aircraft or other vehicle in the event of a crash.

It is another object of the present invention to utilize a pulley arrangement to achieve optimum restraint.

Further, it is an object of the invention to limit vertical movement and forward and lateral displacement of an occupant's upper body and head during a crash.

It is another object of the present invention to provide a wide strap area for wide distribution of crash loads across the shoulders and chest area.

It is a further object of the invention to allow sufficient occupant mobility during normal operation while providing a secure restraint.

It is another object of the present invention to provide a restraint that is easily retrofitted onto conventional seating systems.

It is a further object of the present invention to provide a restraint that does not introduce significant or structural complexity over conventional restraint systems.

These and other objects of the present invention are described in greater detail in the detailed description of the invention, the appended drawings, and the attached claims.

Figure 1:
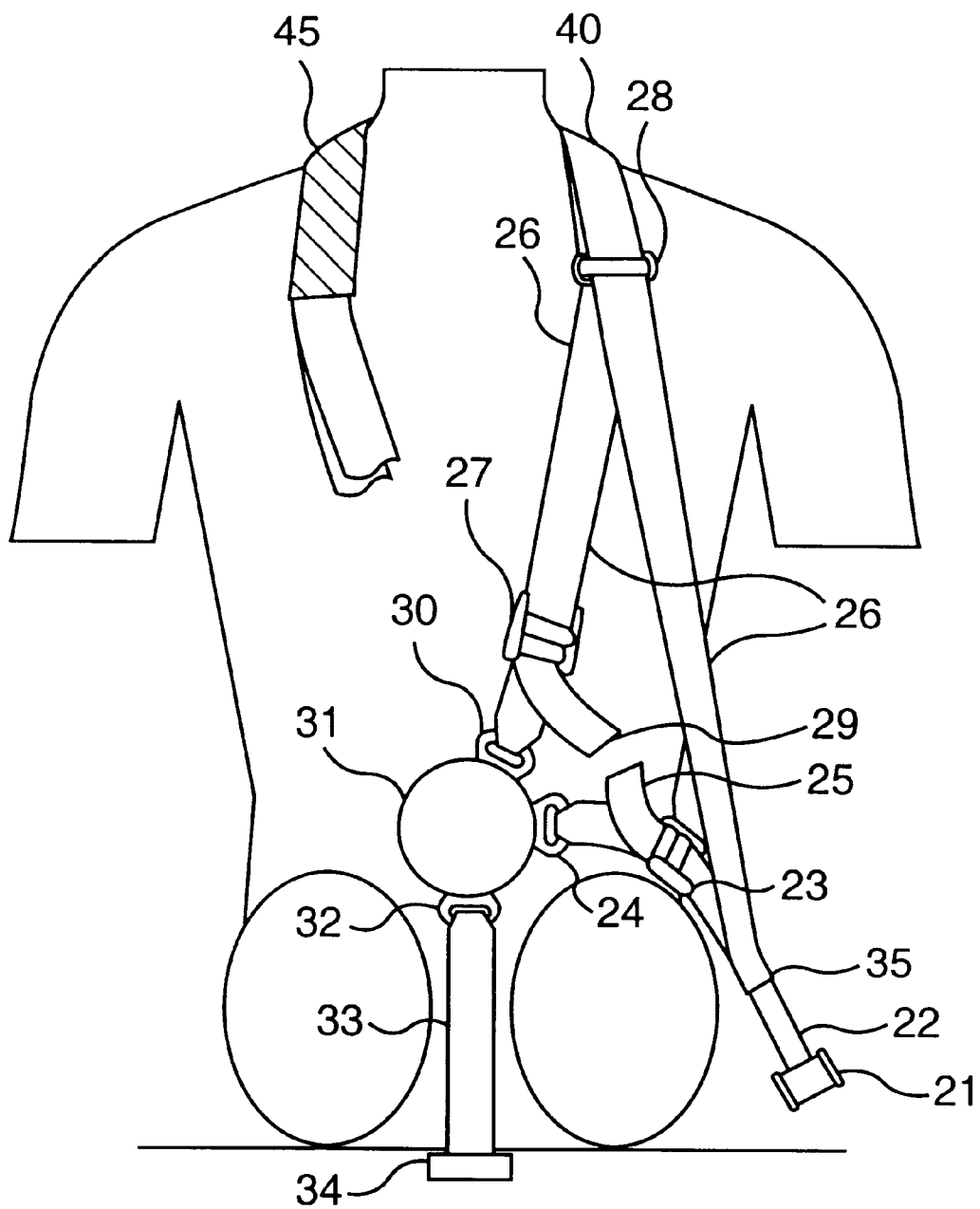
FIG. 1 is a schematic diagram of the front view of the preferred embodiment of the present invention.

In the following description of the preferred embodiment of the invention illustrated in the drawings, specific terminology is used for the sake of clarity. However, the invention is not intended to be limited to the specific terms selected, and it is to be understood that each specific term includes all technical equivalents which operate in a similar manner to accomplish a similar purpose.

DETAILED DESCRIPTION OF THE INVENTION

Figure 2:
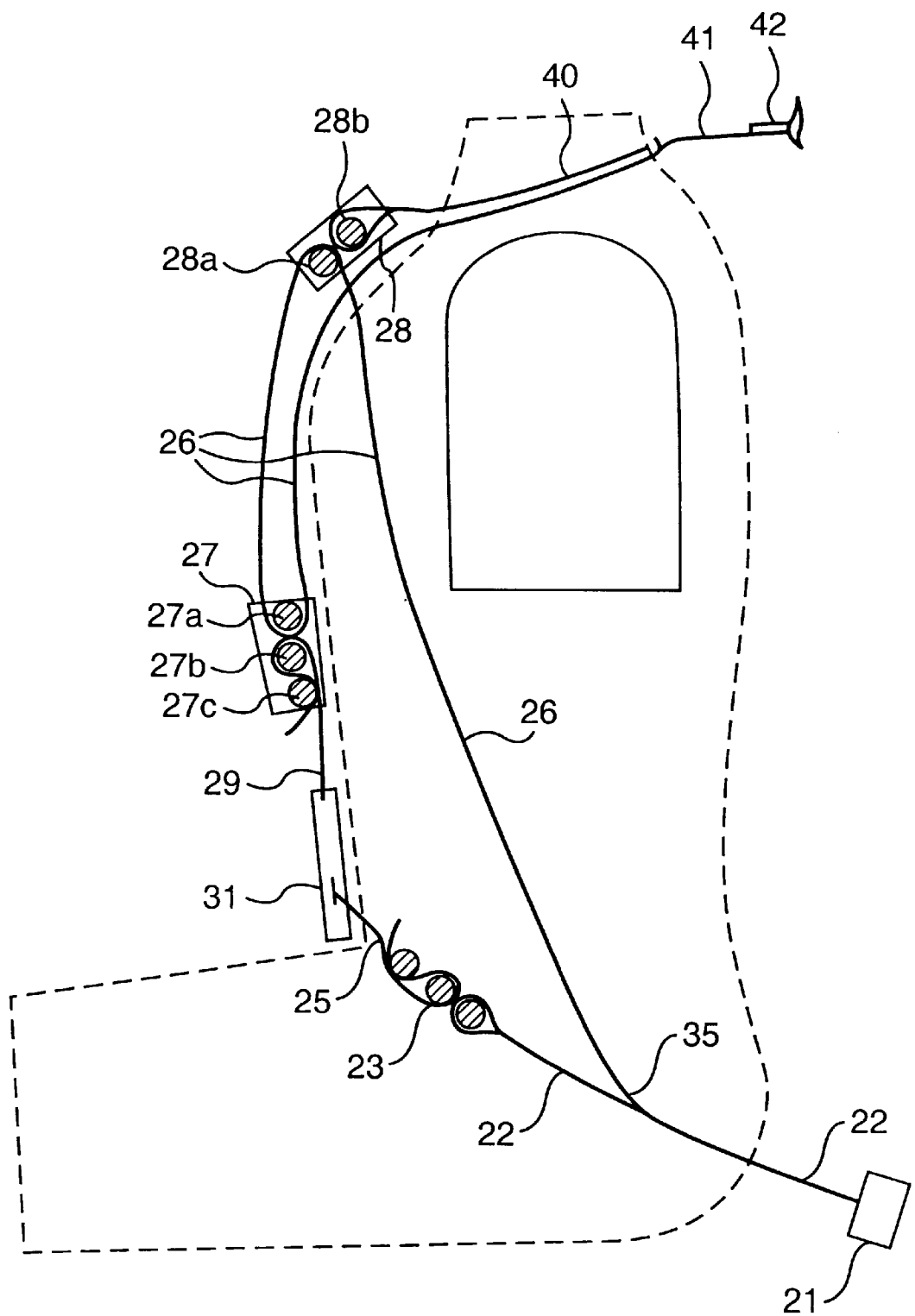
FIG. 2 is a schematic diagram of a side view of the preferred embodiment of the present invention.

FIGS. 1 and 2 show a seat harness containing straps, fittings, adjusters, a five-point release attachment system, and an inertial reel strap end fitting. Items which are mirrored, such as right and left lap belts, are shown in detail and numbered on the left side of the harness only. It is understood, however, that substantially the same materials and construction are to be duplicated for the right side of the harness. The restraint harness of the preferred embodiment is a textile restraint harness. However, the pulley configuration of the present invention can be applied to other kinds of harnesses.

Referring to FIGS. 1 and 2, the preferred embodiment of the present invention includes a left lap belt having an upper section 25 and a lower section 22, a left vertical strap 26, a left metal shoulder guide 28, a left vertical adjusting strap 29 having a metal end fitting 30, and a left shoulder strap adjuster 27. As explained above, there is a corresponding right side component (not shown) for each left side component. The restraint harness system of the present invention also includes a neck strap 40, an optional neck strap cover 45, a lead-in strap 41, a restraint locking device (not shown), one or more neck strap attachment components 42, a conventional five-point release attachment system 31, and one or more conventional seat attachments 21, that anchor the left lap and vertical straps to the seat.

Figure 1A:
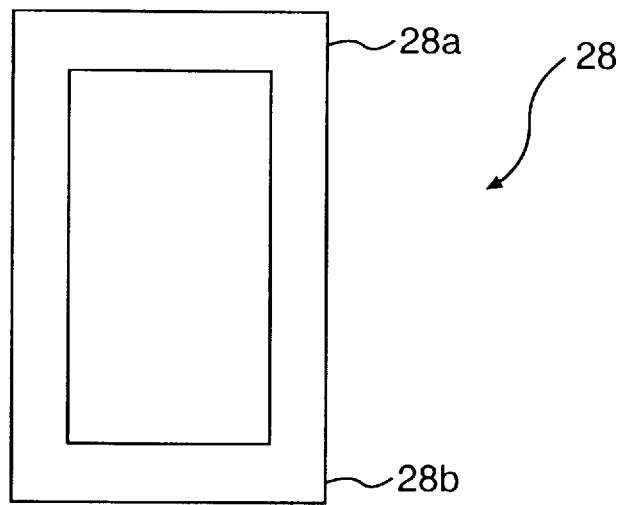
FIG. 1A is a schematic of a shoulder guide which can be used in the preferred embodiment of the present invention.

FIG. 1A illustrates schematically a shoulder guide 28 which can be used in a preferred embodiment of the present invention. The shoulder guide 28 is a metal (preferably steel) rectangle having two bars 28a and 28b around which the straps of the harness restraint of the present invention can be routed. It would be apparent to those skilled in the art that rollers can be used for the bars 28a and/or 28b to facilitate strap routing. It would further be apparent to those skilled in the art that shoulder guide 28 is a standard part that is readily available by a variety of vendors. For example, such parts can generally be found in the parachute industry, from vendors such as Forge craft of Fort Smith, Ark.

Figure 1B:
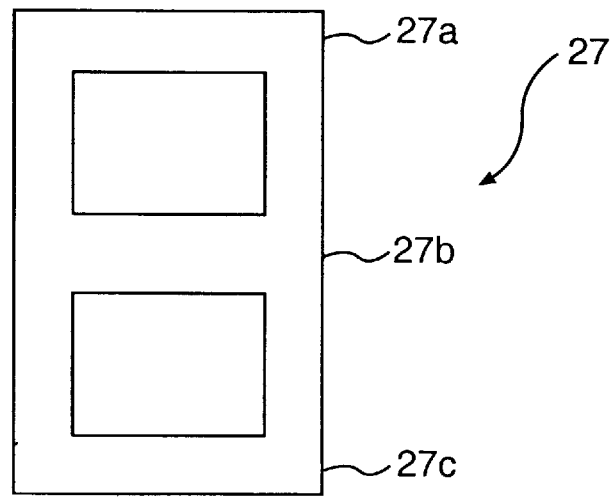
FIG. 1B is a schematic of a shoulder strap adjuster which can be used in the preferred embodiment of the present invention.

FIG. 1B illustrates schematically a shoulder strap adjuster 27 which can be used in a preferred embodiment of the present invention. The shoulder strap adjuster 28 is a metal (preferably steel) rectangle having three bars 27a, 27b and 27c around which the straps of the harness restraint of the present invention can be routed. It would be apparent to those skilled in the art that rollers can be used for the bars 27a, 27b and/or 27c to facilitate strap routing. It would further be apparent to those skilled in the art that shoulder strap adjuster 27 is a standard part that is readily available from a variety of vendors. For example, such parts can generally be found in the parachute industry.

All straps of the preferred embodiment, except for the neck lead-in strap 41, are made of nylon and polyester webbing, e.g., the 7000 lb. nylon and polyester type of webbing. The neck lead-in strap 41 is made of polyester webbing, e.g., the 8000 lb. type of polyester webbing. The lower sections 22 of the lap belts that attach to the seat are a certain width, e.g., 2 inches wide. All other straps are another width, e.g., 1¾ inches wide. These sizes are compatible with conventional, existing seat attachment widths.

The harness is attached to the seat at four points. These points are the restraint locking device (not shown), the two lap and vertical belt seat attachments 21, and a crotch strap seat attachment 34.

The left lap belt has a lower section 22 and an upper section 25. Each lap belt lower section 22 has a lap belt adjuster 23 sewn to one end and a seat attachment 21 sewn to the other end. Each lap belt upper section 25 has an end fitting 24 sewn to one end which locks into a five-point release attachment system 31. The webbing end of each lap belt upper section 25 threads through a lap belt adjuster 23.

Each end of vertical strap 26 is sewn to each lap belt lower section 22 near the seat attachment 21 at a point 35. The vertical strap arrangement is produced by routing the vertical strap 26 on one side upward from where it is sewn to the lower section 22 of the lap belt at point 35, through an oval-shaped shoulder guide 28, downward through the shoulder strap adjuster 27, again upward to an attachment point under the shoulder guide 28, along the neck strap 40 to which the vertical strap 26 is attached, down along the opposite side through an attachment point under the opposite shoulder guide 28, down through the opposite shoulder strap adjuster 27, upward through the opposite shoulder guide 28, and finally downward toward the opposite lap belt lower section 22 to which it is sewn at a point 35.

Figure 2A:
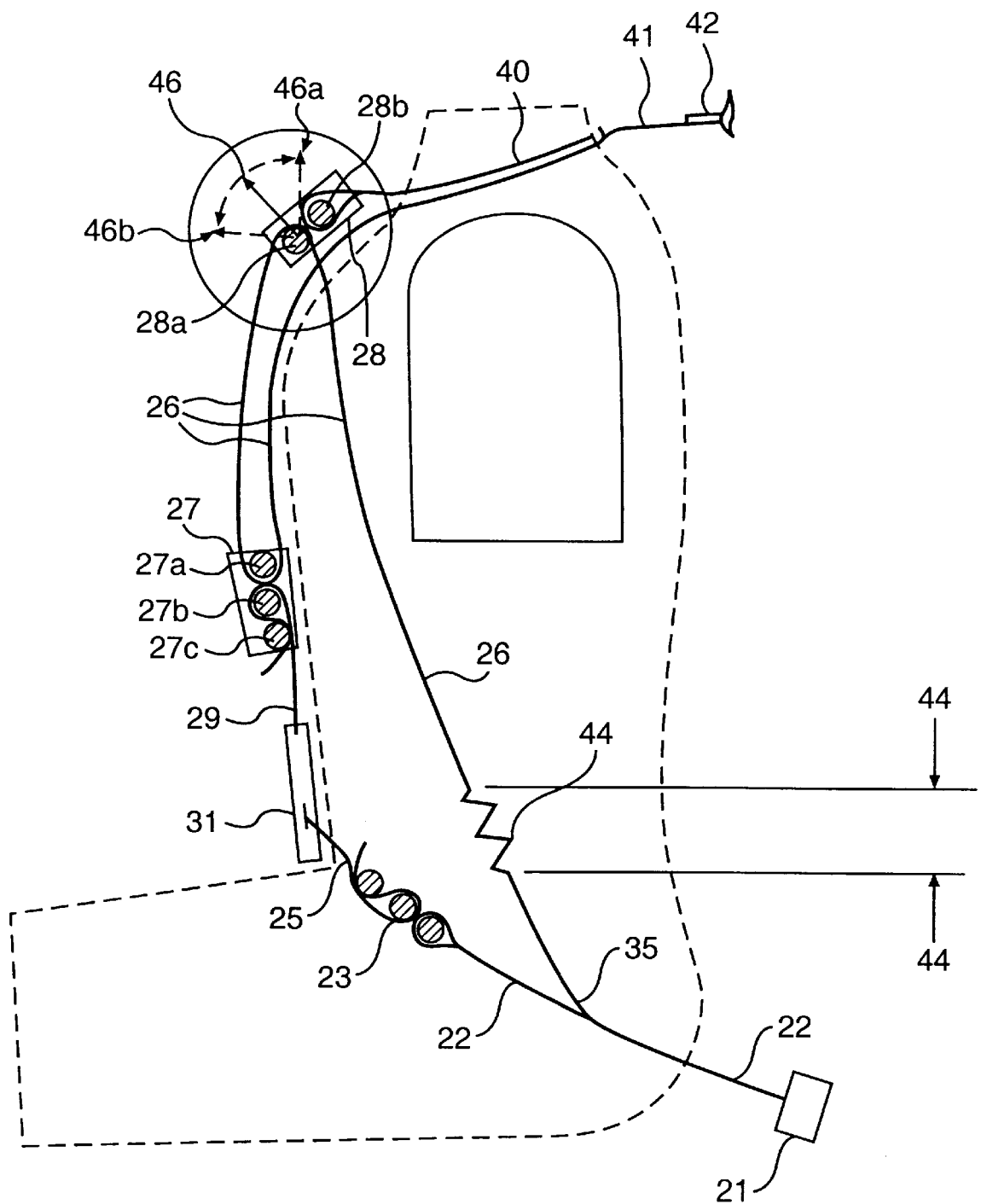
FIG. 2A is a schematic diagram of the two-to-one pulley configuration.

Neck strap 40 is attached to shoulder guide 28 as shown in FIG. 2A. Neck strap 40 is likewise attached to a similar shoulder guide on the opposite side of the occupant. Neck strap 40 substantially prevents the occupant's head and upper torso from movement during a crash. Each of the straps 26, 40 and 41 are sewn together from the left shoulder guide 28 to the right shoulder guide 28 so that the harness restraint forms a complete unit.

This routing achieves a pulley effect which limits the forward movement of the occupant during a crash by one-half over conventional harness restraints. By way of example, FIG. 2A illustrates how the forward movement of the occupant is restrained by one-half during a crash. In the example, the occupant has left two inches of slack 44 in the vertical strap 26. In the event of a crash, the pulley configuration defined by guides 27 and 28 allows the occupant to move only one inch in any direction in the quadrant illustrated by arc 46. Thus, the occupant can move only one inch in the up direction indicated by arrow 46a or one inch in the forward direction, indicated by arrow 46b, or one inch in any direction therebetween, as indicated by arc 46.

It should by noted that in the preferred embodiment, no slack is left in strap 26. Rather, the occupant should remove as much slack as possible, while still maintaining a reasonable comfort level. The invention still achieves its primary goals because it reduces by substantially one-half the amount of occupant movement during a crash, due to any residual slack in the strap and due to stretching of the strap webbing. The reduction in occupant movement during a crash significantly reduces the likelihood and severity of occupant injury resulting from the crash.

This routing also approximately doubles the amount of strap area contacting the occupant over conventional restraint systems. Thus, the restraint system of the present invention distributes crash force over a larger portion of the occupant's body, thereby reducing the amount of crash force on any particular portion of the occupant's body as compared to conventional restraint systems. The reduction in the concentration of crash force significantly reduces the likelihood and severity of occupant injury.

During normal operation, the vertical strap 26 is allowed to freely slide through the shoulder guides 28 and shoulder strap adjusters 27. This freedom of motion provides substantially the same degree of mobility to the occupant as conventional, existing harnesses.

Each vertical adjustment strap 29 has an end fitting 30 sewn onto one end. This end fitting 30 buckles into the top of the five-point release attachment 31. The other end of the vertical adjustment strap 29 is threaded through a shoulder strap adjuster 27.

The neck strap 40 is sewn over the portion of the vertical strap 26 between the right and left shoulder guides 28. In turn, the right and left shoulder guides 28 are sewn onto each end of the neck strap 40.

An optional strap cover 45 can be placed over the neck strap 40 and shoulder guides 28. The optional strap cover 45 provides added comfort and helps prevent wear on the straps. A neck lead-in strap 41 is sewn along the center line of the neck strap 40 at one end and mechanically connected by an inertia reel strap end fitting 42 to a restraint locking device (not shown) at the other end. The fitting 42 is rectangular and made of molded nylon or epoxy material that is bonded to the strap nylon. The restraint locking device is located within the seat back.

The five-point release attachment embodiment of the present invention includes a crotch strap 33. One end of the crotch strap 33 is attached to a metal seat adjustment fitting 34. The metal seat adjustment fitting 34 is attached to the seat (not shown). The other end of the crotch strap 33 is attached to the five-point release attachment 31 using an end fitting 32. The end fitting 32 is sewn to the crotch strap 33. Although the preferred configuration utilizes a five-point release attachment, the present invention could also be configured with a four-point release attachment. This alternative would only eliminate the crotch strap. It would be apparent to those skilled in the art that other release attachment mechanisms having one or more releases can be designed to employ the pulley concept of the present invention to reduce the amount of movement of the occupant during a crash.

The foregoing disclosure of the preferred embodiment of the present invention has been presented for the purposes of illustration and description only. It is not intended to be exhaustive or to limit the invention to the precise form disclosed. In particular, the present invention can be used in ground, sea, or air vehicles, including trains, trucks, buses, vans, boats, ships, and aircraft. Many variations and modifications of the embodiment described herein will be obvious to one of ordinary skill in the art in light of the above information. The scope of the invention is to be defined only by the claims appended hereto, and by their equivalents.

What is claimed is:

1. A vehicle occupant restraint harness comprising:
   (a) a pulley configuration that minimizes occupant motion during a crash and maximizes occupant mobility during normal use;
   (b) a lap belt attached to a side vehicle attachment point;
   (c) a shoulder strap adjuster attached to said lap belt;
   (d) a shoulder guide attached to a top vehicle attachment point; and
   (e) a vertical strap that crosses an occupant's body a plurality of times to contact said occupant's body with a greater strap area than a single crossing of strap, said vertical strap routed from an attachment point on said lap belt, up through said shoulder guide, down through said shoulder strap adjuster, and up to an attachment point on said shoulder guide.

2. The vehicle occupant restraint harness of claim 1, wherein the pulley configuration produces a pull ratio greater than 1:1, such that the pulley configuration limits a distance of movement of an occupant in the vehicle occupant restraint harness to less than a distance of slack in the vertical strap.

3. The vehicle occupant restraint harness of claim 1, further comprising a multiple-point release attachment to connect said lap belt and said shoulder strap adjuster together.

4. The vehicle occupant restraint harness of claim 3, further comprising a crotch strap, with one end of said crotch strap connected to a bottom vehicle attachment point and the other end connected to said multiple-point release attachment.

5. A vehicle occupant restraint harness comprising:
   (a) a multiple-point release attachment;
   (b) a right lap belt, with one end of said right lap belt attached to a right vehicle attachment point and the other end of said right lap belt connected to said multiple-point release attachment;
   (c) a left lap belt, with one end of said left lap belt attached to a left vehicle attachment point and the other end of said left lap belt connected to said multiple-point release attachment;
   (d) a right vertical adjustment strap, with one end of said right vertical adjustment strap connected to said multiple-point release attachment and the other end attached to a right shoulder strap adjuster;
   (e) a left vertical adjustment strap, with one end of said left vertical adjustment strap connected to said multiple-point release attachment and the other end attached to a left shoulder strap adjuster;
   (f) a neck strap, with one end of said neck strap attached to a left shoulder guide, with the other end of said neck strap attached to a right shoulder guide, and with the center of said neck strap attached to a neck lead-in strap, wherein said neck lead-in strap is attached to a top vehicle attachment point;
   (g) a left pulley configuration using a left vertical strap routed from an attachment point on said left lap belt up through said left shoulder guide, down through said left shoulder strap adjuster, and up to an attachment point on said left shoulder guide; and
   (h) a right pulley configuration using a right vertical strap routed from an attachment point on said right lap belt up through said right shoulder guide, down through said right shoulder strap adjuster, and up to an attachment point on said right shoulder guide.

6. The restraint harness of claim 5, further comprising a strap cover enclosing said neck strap, said vertical strap, said left shoulder guide, and said right shoulder guide.

7. The restraint harness of claim 5, wherein said left and right shoulder guides and said left and right shoulder strap adjusters have rotating rollers around which said left and right vertical straps travel, respectively.

8. The restraint harness of claim 5, wherein said right lap belt, said left lap belt, said right vertical adjustment strap, said left vertical adjustment strap, said right vertical strap, said left vertical strap, and said neck strap are made of 7000 lb. nylon and polyester webbing and wherein said neck lead-in strap is made of 8000 lb. polyester webbing.

9. A method for restraining a vehicle occupant during a crash, comprising the steps of:
   (a) restraining said occupant with a right and a left lap belt;
   (b) attaching a vertical strap to said left lap belt at a left attachment point;
   (c) routing said vertical strap from said left attachment point up through a left shoulder guide, down through a left shoulder strap adjuster, up through an attachment point at said left shoulder guide, up through a top vehicle attachment point, down through an attachment point at a right shoulder guide, down through a right shoulder strap adjuster, up through said right shoulder guide, and down toward said right lap belt; and
   (d) attaching said vertical strap to said right lap belt at a right attachment point.

10. A vehicle occupant restraint harness comprising:
    (a) a multiple-point release attachment;
    (b) a right lap belt, with a first end of the right lap belt attached to a right vehicle attachment point and a second end of the right lap belt connected to the multiple-point release attachment;
    (c) a left lap belt, with a first end of the left lap belt attached to a left vehicle attachment point and a second end of the left lap belt connected to the multiple-point release attachment;
    (d) a left pulley configuration comprising a left strap, a left lower fixed point, and a left upper fixed point, wherein the left strap is attached to the left lap belt, and is routed from the left lap belt through the left upper fixed point, through the left lower fixed point, and through the left upper fixed point, and is attached to a left upper vehicle attachment point, and wherein the left pulley configuration produces a left pull ratio that reduces slack in the left strap; and
    (e) a right pulley configuration comprising a right strap, a right lower fixed point, and a right upper fixed point, wherein the right strap is attached to the right lap belt, is routed from the right lap belt through the right upper fixed point, through the right lower fixed point, and through the right upper fixed point, and is attached to a right upper vehicle attachment point, and wherein the right pulley configuration produces a right pull ratio that reduces slack in the right strap.

11. The restraint harness of claim 10, wherein the left pull ratio and the right pull ratio are 2:1, such that the left pulley configuration limits a distance of movement of an occupant in the vehicle occupant restraint harness to half of a distance of slack in the left strap, and the right pulley configuration limits the distance of movement of the occupant in the vehicle occupant restraint harness to half of a distance of slack in the right strap.

12. The restraint harness of claim 10, further comprising:
(f) a neck strap attached to the left upper fixed point and the right upper fixed point; and
(g) a lead-in strap attached to the neck strap and a vehicle structure,
wherein the left strap and the right strap are a single strap that is attached to the neck strap between the left upper vehicle attachment point and the right upper vehicle attachment point.

13. The restraint harness of claim 10, wherein the left pull ratio and the right pull ratio are greater than 1:1, such that the left pulley configuration limits a distance of movement of a occupant in the vehicle occupant restraint harness to less than a distance of slack in the left strap, and the right pulley configuration limits the distance of movement of the occupant in the vehicle occupant restraint harness to less than a distance of slack in the right strap.

14. The restraint harness of claim 10, further comprising a crotch strap connected to a bottom vehicle attachment point and connected to the multiple-point release attachment.

15. The restraint harness of claim 10, wherein the left lower fixed point and the right lower fixed point are shoulder strap adjusters, and wherein the left upper fixed point and the right upper fixed point are shoulder guides.

16. The restraint harness of claim 15, wherein the shoulder strap adjusters are attached to the multiple-point release attachment.

17. The restraint harness of claim 15, wherein the shoulder guides are attached to an upper vehicle attachment point.

18. The restraint harness of claim 15, wherein the shoulder strap adjusters and the shoulder guides include one of bars and rollers over which the left strap and the right strap freely travel.

19. A pulley configuration for a vehicle occupant harness restraint system, comprising:
(a) a strap with a first end and a second end;
(b) an upper attachment point that attaches the first end of the strap to a vehicle above an occupant's torso;
(e) a lower attachment point that attaches the second end of the strap to the vehicle below the occupant's torso;
(d) an upper fixed pulley point; and
(e) a lower fixed pulley point,
wherein the strap is routed from the lower attachment point through the upper fixed pulley point, through the lower fixed pulley point, through the upper fixed pulley point, and to the upper attachment point.

20. A vehicle occupant restraint harness for restraining an occupant's torso in a vehicle, comprising;
(a) an upper fixed pulley point;
(b) a lower fixed pulley point below the upper fixed pulley point;
(c) a strap routed from below the occupant's torso around the upper fixed pulley point, around the lower fixed pulley point, and to above the occupant's torso.

21. The restraint harness of claim 20, wherein the strap has a first end and a second end, wherein the first end is attached to the vehicle below the occupant's torso and below the lower fixed pulley point, and the second end is attached to the vehicle above the occupant's torso and above the upper fixed pulley point,
and wherein the strap is routed from the first end around the upper fixed pulley point, around the lower fixed pulley point, and to the second end.

22. The restraint harness of claim 20, wherein the upper fixed pulley point is a shoulder guide and the lower fixed pulley point is a strap adjuster.

23. The restraint harness of claim 22, wherein the shoulder guide and the strap adjuster include one of a bar and a roller over which the strap freely travels.

* * * * *